Figures 1, 9:
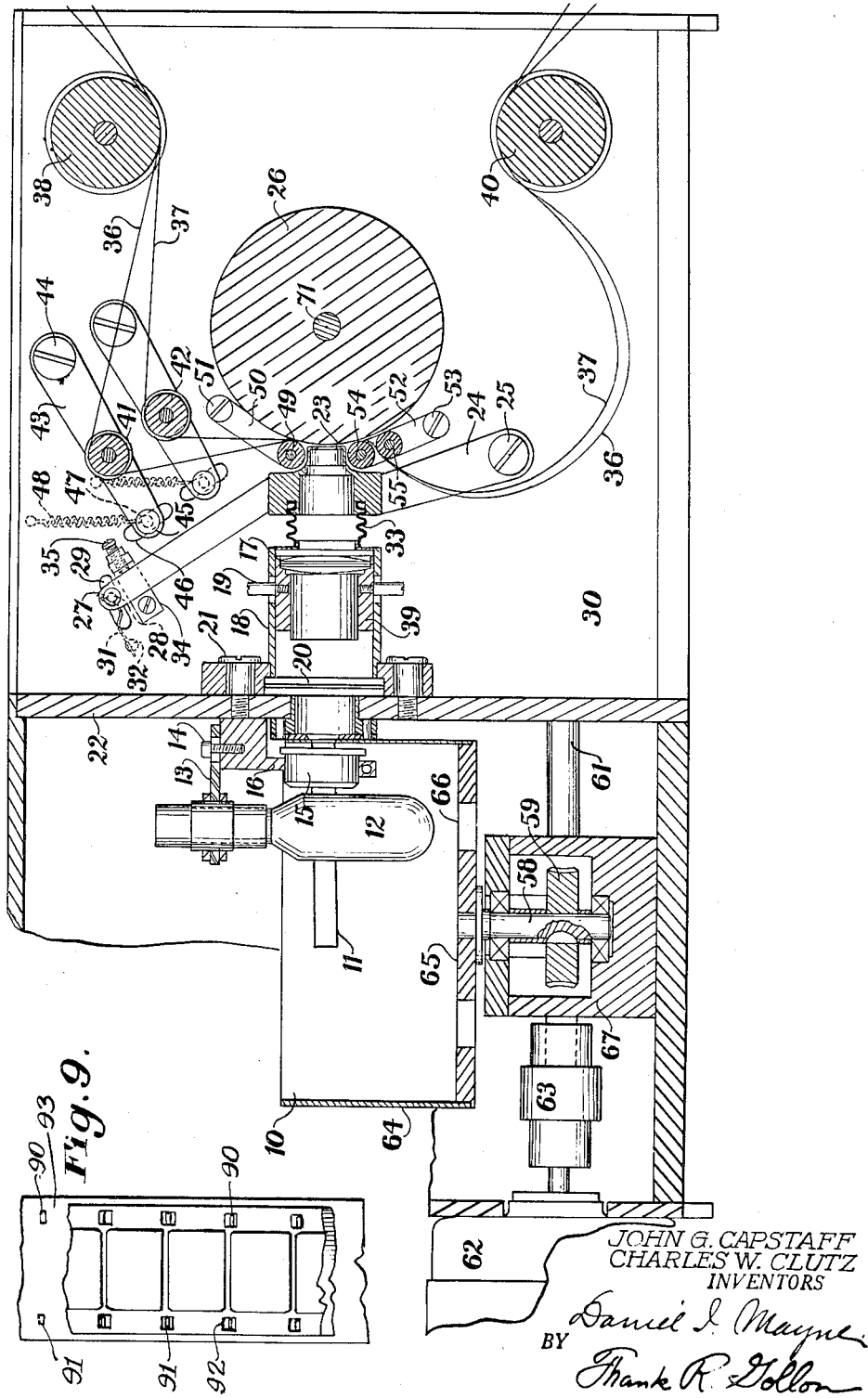

May 29, 1956 J. G. CAPSTAFF ET AL 2,747,478
CONTINUOUSLY DRIVEN PRINTING MACHINE
Filed April 28, 1951 3 Sheets-Sheet 1

JOHN G. CAPSTAFF
CHARLES W. CLUTZ
INVENTORS

BY Daniel I. Mayne
Frank R. Dollon
ATTORNEYS

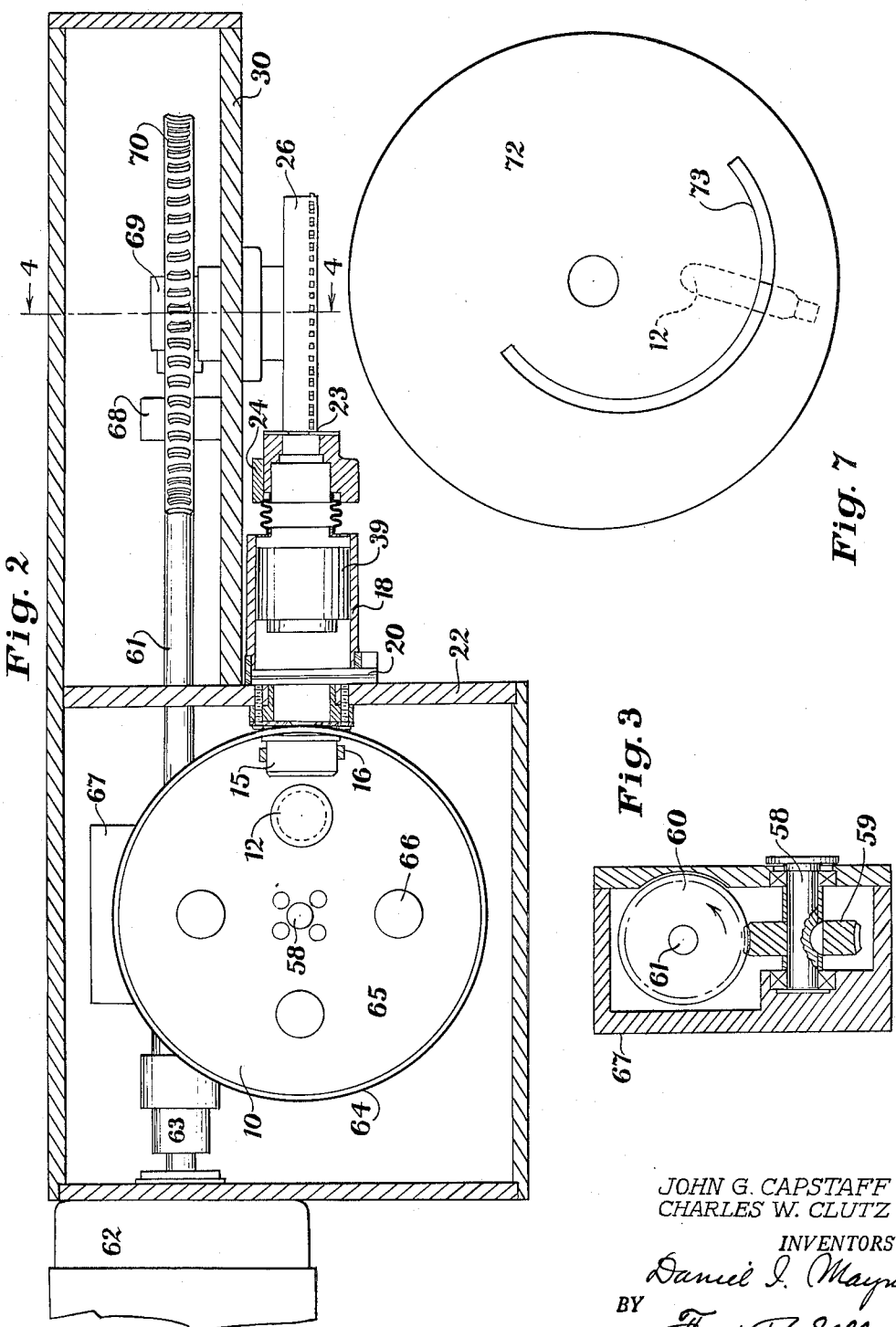
May 29, 1956   J. G. CAPSTAFF ET AL   2,747,478
CONTINUOUSLY DRIVEN PRINTING MACHINE
Filed April 28, 1951   3 Sheets-Sheet 2
JOHN G. CAPSTAFF
CHARLES W. CLUTZ
INVENTORS
BY
ATTORNEYS

JOHN G. CAPSTAFF
CHARLES W. CLUTZ
INVENTORS

BY *Daniel I. Mayne*
*Frank R. Gollon*
ATTORNEYS

United States Patent Office 2,747,478
Patented May 29, 1956

2,747,478

CONTINUOUSLY DRIVEN PRINTING MACHINE

John G. Capstaff and Charles W. Clutz, Rochester, N. Y., assignors to Eastman Kodak Company, Rochester, N. Y., a corporation of New Jersey Application April 28, 1951, Serial No. 223,504

7 Claims. (Cl. 95—75)

The present invention relates to a means for photographic printing. More specifically, it relates to an improved printing machine adapted for continuously moving films which are intermittently exposed to a printing beam which is caused to move in synchronism with the films.

Printing machines for motion-picture film have been generally of two types, continuous and intermittent. While the former has been preferred because of the relatively higher speed of operation, this type has the inherent shortcoming which results from the difficulty of maintaining registration of the negative and positive films during exposure of the films. This is caused primarily by differences in dimensions of the negative and positive films and by variations in the perforation sizes and in their spacing, which conditions arise from shrinkage of the film occasioned by processing and by aging. The problem of maintaining registration during exposure of the films while these these are in continuous motion through the printer has been one of considerable magnitude. Shifting or creeping of one film relative to the other during exposure results in prints of poor definition, which is especially objectionable in motion-picture film because of the very considerable enlargement of the image projected upon the screen. While the maintenance of registration of the films during exposure is of prime importance in the production of ordinary black and white prints from a single negative, it is of even greater concern in color printing. For example, in the duplication of color motion-picture film, such as Kodachrome, the process often employed involves the printing of separation negatives from the tricolor master positive. In making these negatives, it is of particular importance that registration of the negative and positive films be maintained during exposure. In the lenticular process and in other well-known multicolor processes prints are sometimes produced by the successive printing of a plurality of negatives upon a light-sensitive film, each negative corresponding to a particular color. Here again, it is of the utmost importance that each negative register correctly and precisely with the light-sensitive film during exposure.

Prior art devices have in general met the difficulty of holding registration during the exposure interval by resorting to the use of an intermittent feed. In such devices, the superposed films are fed intermittently to a position before the printing aperture, where they are caused to be registered both laterally and longitudinally despite variations in sizes caused by shrinkage of the film. This registration is effected by the use of pins which engage the film perforations after the films have been moved into position before the aperture. The pins are usually of such cross section that a single pin fills the superposed film perforations both laterally and longitudinally and others fill other film perforations in only one such direction to compensate for small variations in perforation spacing in the two films. The exposure is made while the films are thus fixed in position, after which the pins are withdrawn and the films again advanced. In the case of projection printers, separate sets of pins are employed to register each of the two films. Contact printing and projection printing machines of the above type are usually slower in operation than those of the continuous feed type and are more complicated because of the intermittent feed and reciprocating pin mechanisms. Moreover, the use of such machines, especially at higher speeds, entails serious risk of damage to the film perforations.

There is disclosed in U. S. Letters Patent 2,552,255, granted to J. G. Capstaff May 8, 1951, a continuous printer in which the teeth of the printing sprocket are so dimensioned and spaced and the shutter so synchronized with the rotation of the sprocket that but a single tooth in each row of sprocket teeth drives the superposed films past the printing aperture during the exposure interval. In this manner, no slippage of the films upon the sprocket can occur during the exposure, the films being permitted to adjust their position relative to each other and to the sprocket while the driving force of the sprocket is transferred from one pair of teeth to a second during the interval when the printing beam is occluded. Since relative movement between the films may occur between exposure intervals when the driving force of the sprocket is transferred from one pair of teeth to a second, the machine of the above patent is adapted to expose a complete picture frame during each exposure interval. This it does by employing an aperture plate which masks the width of the printing beam to the width of a picture frame and the height of the beam to the height of a picture frame plus the thickness of a frame-line interposed between consecutive picture frames. The shutter is adapted to uncover the printing beam to expose the film at the moment that a complete picture frame emerges into the area defined by the opening in the aperture plate and the exposure continues while the films travel a distance equal to the thickness of the frame-line. The shutter then immediately occludes the printing beam and continues to do so until the next picture frame completely enters the area defined by the aperture plate opening. It is during this latter period of non-exposure that the driving force of the sprocket is transferred from one pair of teeth to a second and during which the films are permitted to adjust their positions relative to each other upon the sprocket. During the actual exposure of each picture frame only a single tooth in each row of sprocket teeth drives the superposed films.

It will be readily apparent that in a machine, such as described above, the length of exposure will be determined in part by the thickness of the frame-line. This requires that, where film having a relatively slow speed emulsion is to be exposed in the printer, the movement of the films through the machine will be at a relatively low rate of speed in order that sufficient exposure time might be had. Moreover, all motion-picture films do not have the relatively thick frame-line that is had on 35 mm. film and which came into being with the addition of the sound track to the 35 mm. film. In 16 mm. and 8 mm. films, the frame-line is not of sufficient thickness to provide adequate exposure in such a printer as described in Patent No. 2,552,255. The present invention is intended to remedy the above situation by providing a moving printing beam, the height of which is equal to the height of a picture frame and the movement of which is synchronized with the travel of the films upon the sprocket, so that a complete picture frame is continuously exposed during the exposure interval. Moreover, the shutter forming the printing beam is so synchronized with the sprocket driving the film and the sprocket teeth are so dimensioned and spaced thereon, that but a single tooth in each row of teeth drives the superposed films during the exposure interval. With such a machine, it is obvious, the exposure time can be lengthened considerably and this time would no longer be dependent upon the thickness of the frame-line between consecutive frames. Such an apparatus, as will be described below, is readily adaptable for the printing of films having relatively slow speed emulsions or with films having frame-lines of small thickness.

It is, therefore, an object of the present invention to provide an improved printing machine in which the films are moved continuously and in which the difficulties resulting from unequal shrinkage of the films are effectively overcome.

It is a further object of this invention to provide a printing machine of the character described in which relative movement between the films is precluded during the intervals of exposure of the films.

It is a still further object of this invention to provide an apparatus of the character described in which the continuously driven films are intermittently exposed to a printing beam which is caused to travel in synchronism with the films during the successive exposure intervals.

It is a still further object of this invention to provide a printing machine of the character described which, though capable of rapid operation, is adapted to provide intermittent exposure intervals of adequate duration for the effective printing of the continuously driven film.

Other objects and advantages of the invention will become apparent from the following description taken in connection with the accompanying drawings, and it will be understood that many changes may be made in the details of construction and arrangement of parts shown and described without departing from the spirit of the invention as expressed in the accompanying claims. For purposes of illustration, the present invention is described as embodied in a contact printer. However, as would be obvious to one skilled in the art, the invention is equally applicable to a projection or optical printer of the type employing a single sprocket in which the negative is in limited engagement with one side of the sprocket and the positive with the other side. A printer of this type is disclosed in U. S. Letters Patent 1,584,185, granted to G. A. Mitchell, May 11, 1926. We, therefore, do not wish to be limited to the exact details shown and described, as the preferred forms only have been shown by way of illustration.

Figure 4:
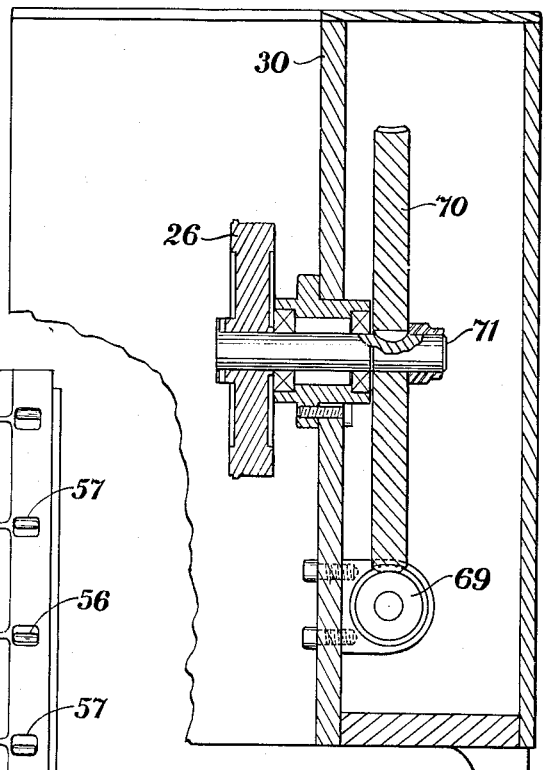
Figure 5:
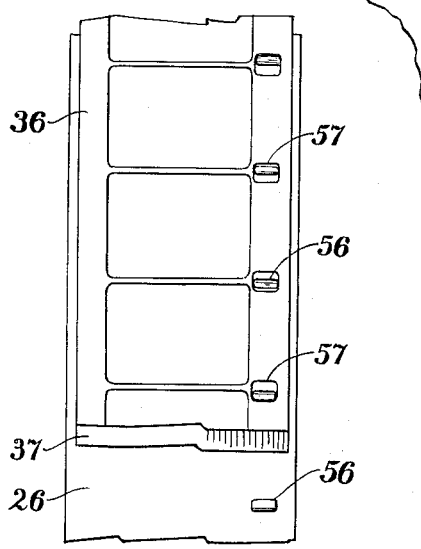
Figure 6:
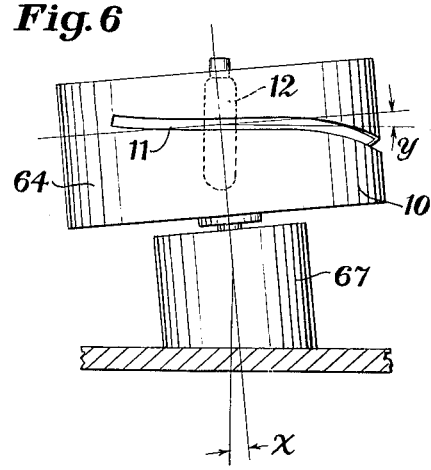
Figure 8:
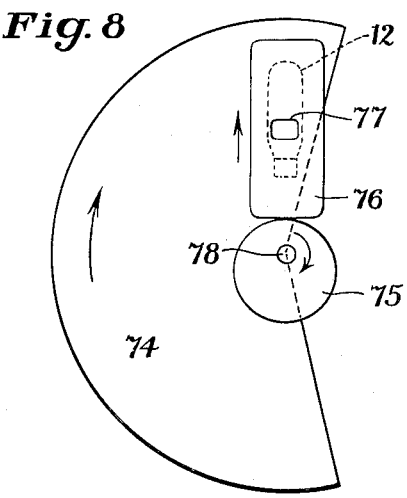

In the drawings:

Fig. 1 is an elevational view in section of a contact printer embodying the present invention, Fig. 2 is a plan view, partly in section, of the contact printer illustrated in Fig. 1, Fig. 3 is a sectional view of the gear box assembly through which the main drive shaft rotates the drum-type shutter, Fig. 4 is a sectional view taken on the line 4—4 of Fig. 2, Fig. 5 is an enlarged and partial view showing the films superposed upon the printing sprocket, Fig. 6 is a diagrammatic view illustrating the manner in which the drum-type shutter and gear box assembly are preferably tilted to make the top and bottom edges of the shutter slot parallel to the picture frame edges, Fig. 7 is a diagrammatic view of a modified type of shutter which may be substituted for the drum-type of shutter in the contact printer described herein, Fig. 8 is a diagrammatic view of still another variety of shutter mechanism which may be employed in the presently described apparatus, and Fig. 9 is an enlarged and partial view showing films superposed upon a modified form of printing sprocket.

Essentially, the apparatus embodying the present invention comprises a source of illumination, a shutter mechanism, an optical projection system, a printing sprocket and means to synchronously drive the shutter mechanism and the printing sprocket. The shutter mechanism in the preferred form of the invention, illustrated in Figs. 1 and 2, comprises a drum-type shutter 10 having a helical slot 11 which rises along the peripheral drum surface to produce a printing beam which is caused to move by the rotation of the drum, as will be presently described. The source of illumination is the lamp 12 which is suspended within the drum from a mounting bracket 13 which may be adjusted by the screw 14 to correctly position the lamp relative to the optical system and printing sprocket. The optical system includes a first condenser lens in the mounting 15 which is also susended within the drum 10 by means of the bracket 16. A second condenser lens 17 is mounted in a sleeve 39 which is slidable in the lens tube 18 for purposes of focussing, a pair of finger-engaging elements 19 secured to the sleeve projecting through slots in lens tube 18. A heat absorbing or reflecting filter 20 of conventional design is adapted to be slid into position at the end of the lens tube 18 to intercept the heat rays emanating from the light source. The mounting for the second condenser lens and heat filter, including the lens tube, is secured by screw means 21 to the wall 22 which is part of the housing for the light source 12 and the rotatable drum 10.

A film gate or aperture plate 23 is mounted on the arm 24 which is pivoted about the screw 25. To facilitate threading of the films past the printing station the arm 24 has an extension which terminates in finger-engaging means 27 by means of which the operator may swing the gate into operative position or away from the printing sprocket. The finger-engaging means includes an integral, rearwardly extending pin 28 which passes through the slot 29 in the mounting wall 30 and which is adapted to be spring pressed to the right by the bend in the end of the leaf spring 31 (see Fig. 1). The leaf spring, mounted by means of pin 32 to the rear of wall 30, is sufficiently flexible so that the operator may rotate the arm 24 counterclockwise whereby the pin 28 will ride under the bend in the spring to the left thereof to swing and hold the film gate away from the printing sprocket. The film gate 23 is connected to the lens tube 18 by means of a corrugated flexible tube 33 which precludes the escape of stray light from the beam projected upon the superposed films at the printing station. It is necessary that the film or printing gate itself be slightly spaced from the printing sprocket, when in operative position, inasmuch as the films must be permitted to slip relative to each other and to the printing sprocket during the dark intervals, as will be discussed further below. To this end, a bracket 34 and screw 35 threaded therein are provided, the screw end being adapted to bear against the extension of arm 24 in opposition to the resilient urging of leaf spring 31, whereby the adjustment of screw 35 will determine the distance the printing gate is spaced from the printing sprocket.

The two films 36 and 37 are led to the printing apparatus by passage over the sprocket 38 which is of conventional design for the driving of film having a single row of perforations along an edge thereof. The apparatus illustrated and described herein is designed for the printing of film having a single row of perforations, such as 16 mm. sound film, although, as will be explained below, the present invention is also adapted for the printing of films having two rows of perforations in which case the several sprockets may have two rows of teeth thereon. A sprocket 40, which is a duplicate of sprocket 38, serves as means for carrying the films from the printer after the exposures have been made. Both sprockets 38 and 40 are journalled in the wall 30 and are adapted to be synchronously driven with the printing sprocket 26 by conventional gear connections (not shown) located behind the wall 30. As will be explained below, it is necessary that a back tension be maintained on the films 36 and 37 in the interval of their travel between the feed sprocket 38 and the printing sprocket 26. This is accomplished by the use of spring-loaded rollers 41 and 42 over each of which one of the two films pass. These rollers, like sprockets 38 and 40, are preferably provided with edge flanges and they, furthermore, may be undercut, if desired, to preclude abrading either the emulsion or the film base, as the case may be, in the picture areas. The mounting of but one of the rollers will be described to explain its operation but it will be understood that the other roller is constructed and mounted in an identical manner. Roller 41 is journalled in the pivot arm 43 at a point between the two extremities of the arm, one end of which is rotatable about the screw 44. The other end of the arm is provided with finger-engaging means 45 by which the arm may be manually operated for threading the film 36 through the apparatus. The finger-engaging means is provided with a rearwardly extending pin 47 which passes through slot 46 in wall 30 and to which is connected a tension spring 48 positioned behind wall 30, which resiliently urges the arm 43 upwardly to maintain the film 36 in a taut condition between the sprocket 38 and the printing sprocket 26.

The roller 49 functions as guide means for conducting the films 36 and 37 into superposed relation upon the printing sprocket 26. This roller, provided with a peripheral groove which registers with the row of teeth on the printing sprocket, is mounted on the arm 50 which pivots about the screw 51 by which the arm is also secured to the wall 30. To resiliently urge the guide roller 49 toward the printing sprocket 26 and yet permit the arm 50 to be manually swung with the roller away from the sprocket for purposes of threading the films, this arm is provided with a rearwardly extending pin which cooperates with a leaf spring mounted behind the wall 30 in much the same manner as the spring 31 and pin 28 on the gate-mounting arm 24 function for a similar purpose. Since this leaf spring and pin on arm 50 are essentially identical in construction to those serving the arm 24, they have been omitted from the drawings.

The arm 52 which pivots about the screw 53, by which this arm is mounted upon the wall 30, carries at its free end a pair of rollers 54 and 55 which function as stripping means to remove the films from the printing sprocket after these have travelled past the printing gate. Roller 54 is essentially identical in construction to guide roller 49, having a peripheral groove which registers with the row of teeth on printing sprocket 26. Since roller 55 is normally spaced from the printing sprocket a sufficient distance to clear the sprocket teeth, no groove need be provided in its peripheral surface. The arm 52 carrying rollers 54 and 55 is resliently urged toward the printing sprocket, from which it may be manually retracted for threading of the films, by such a leaf spring and engaging pin as are used on each of arms 24 and 50. The films 36 and 37, after being stripped from the printing sprocket 26, are engaged by the sprocket 40 which leads the films from the apparatus, the films being suspended in free loops between the stripping rollers and sprocket 40.

The printing sprocket 26 constitutes an important feature of this invention, since the single row of teeth 56 thereon are so dimensioned and spaced that but a single tooth drives the superposed films past the printing gate or aperture plate during each exposure interval. It may here be noted that the present invention is particularly intended for use with films having the square-type or Eastman-type of perforation, the straight sides of the film perforations being obviously necessary for the satisfactory functioning of the printer as will become apparent from the following description. The teeth are so spaced upon sprocket 26 that each film perforation 57 of those superposed lengths of film in engagement with the sprocket is engaged by a sprocket tooth. The teeth 56 are of a width equal to that of the film perforations which thus maintain lateral registration of the films while they are carried by the sprocket 26 past the printing aperture or film gate 23. The thickness of the teeth, however, is less than the height of the film perforations and the leading edges of the teeth are so relatively spaced that the distance therebetween is somewhat greater than the pitch of film perforations whereby the leading edge of but a single tooth will contact the aligned leading edges of the perforations of the superposed films which are in engagement with the printing sprocket. This is clearly illustrated in Fig. 5. It will thus be apparent that by proper synchronization of the shutter mechanism with the sprocket a single tooth will function to drive the superposed films during the exposure interval past the printing gate, whereby the possibility of relative slippage or creep occurring between the films during exposure, resulting from the negative and positive films being of somewhat different size due to, for instance, unequal shrinkage of the films, is precluded. It will be apparent, too, that because the pitch of the leading edges of the sprocket teeth 56 is slightly greater than the normal pitch of the film perforations, it is necessary that the films have only limited engagement with the printing sprocket so that each film perforation of the films superposed on the sprocket will readily receive without interference a sprocket tooth therein. For this reason, both the guide roller 49 and stripping rollers 54 and 55 are located in relatively close proximity to the printing gate. In operation, the tooth which drives the films during the exposure interval is withdrawn from the aligned film perforations during the ensuing dark interval, as the films are removed from the sprocket by the stripping rollers. Thereafter, the superposed films on the sprocket may slip relative to the peripheral surface of the sprocket until the leading edge of the next tooth thereon has contacted the aligned edges of the film perforations engaged by this tooth, whereby the motive force of the sprocket has been transferred from one tooth to the following tooth. The latter operation is effected entirely during the dark interval after which the shutter is again opened and the exposure of the next picture frame is made while the films continue to be driven by a single sprocket tooth, after which the light is again occluded while the second tooth is withdrawn from the films by the continued rotation of the sprocket. It is again noted that the shutter mechanism is synchronized with the rotation of the printing sprocket in order that each exposure of a picture frame may be made while the leading edge of a single sprocket tooth drives the superposed films and in order that the printing beam may be occluded while the motive force of the sprocket is transferred from one tooth to the next. It is only during the latter operation that the films, if of slightly different sizes, will adjust their positions relative to each other. During the exposure interval all relative movement between the two films is obviously eliminated. It is obvious now why it is important to maintain a continuing back tension upon the films 36 and 37. Such tension permits the leading edges of the two perforations of the superposed films to be quickly drawn up against the leading edge of the sprocket tooth as the motive force is transferred from the preceding tooth to this tooth.

The printing sprocket 26 and rollers 49, 54 and 55 may, if desired, have their peripheral surfaces undercut to avoid any possible abrasion of the picture areas. It is of some advantage, however, not to undercut the printing sprocket in order that this present a firm, uninterrupted surface to the films to better support them against the possibility of relative movement between the films caused by the lack of support at the central or picture areas of the films.

While the present invention has been described as embodied in a printer adapted for use with 16 mm. sound film, it is obviously readily adaptable to the printing of 8 mm. or other films. Moreover, the printing sprocket may be provided with two rows of teeth, as illustrated in Fig. 9, for use with films having two rows of perforations, such as 16 mm. films without sound. In the latter application one row of teeth 90 is dimensioned and spaced upon the sprocket 93 as described above in connection with the 16 mm. sound film printer. The second row of teeth 91 will preferably be of a width somewhat less than the width of the film perforations 92 to contact neither of the side walls of the film perforations engaged thereby. The thickness of the teeth of this second row will, however, like that of the teeth of the first row, be less than the height of film perforations and these teeth will have leading edges aligned with those of the first row. It should be understood, however, that the particular printing sprocket described and illustrated herein for use with 16 mm. sound films may be used with films having two rows of perforations, although for the latter, two rows of sprocket teeth will provide somewhat better support for the films than will one row. Similarly, a printing sprocket such as is described in Patent No. 2,552,255 may be employed in such an apparatus as herein disclosed for the printing of 35 mm. film where it is necessary to increase the exposure time without a corresponding decrease in the operating speed of the printer.

The drum-type shutter 10 is mounted upon the shaft 58 to which is keyed worm gear 59. The latter meshes with the worm 60 secured on the drive shaft 61 which is coupled to the motor 62 by coupling 63. The shutter itself comprises a cylindrical wall 64 which is mounted on base 65 to which the shaft 58 is rigidly secured. A series of openings 66 are cut into the base 65 for ventilating the interior of the drum in which the lamp 12 is suspended. Air scoops or fan blades (not shown) may be mounted in the drum to draw air upwardly through the openings 66 into the drum to assist the normal upward course of the convection currents through the drum. Light-tight openings (not shown) are provided in the roof and in the lower portions of the side walls of the chamber which houses the shutter mechanism and printing lamp for inducing a beneficial circulation of air through this housing. The helical slot 11 cut in the shutter wall produces the printing beam which is projected by the optical system through the film gate 23 upon the superposed films engaged on the printing sprocket 26. Since the slot is in the form of a helix or inclined, rotation of the drum by the motor 62 through the connecting gears causes the printing beam to travel downwardly in synchronism with the movement of the films upon the printing sprocket. The drum 10 and gear box assembly 67 are preferably tilted, as diagrammatically illustrated in Fig. 6, to make the top and bottom edges of the shutter slot parallel to the picture frame edges. This tilting of the drum and gear box assembly is not shown in Figs. 1 and 2 to simplify these figures but it is to be understood that they are so tilted in accordance with the showing in Fig. 6. To produce the desired result it is necessary that the angle of tilt $x$ be equal to the rise angle $y$ of the helical slot. The width of the slot is such that the height of the beam projected at the film gate is equal to the height of a picture frame. The aperture in the film gate is of a width equal to the width of a picture frame whereby the beam is suitably masked to the width of a picture frame. The height of the aperture is somewhat greater, however, than the height of the projected beam to allow for the downward travel of the beam caused by the rotation of the drum. This aperture height will be determined by the length of the helical slot in the drum and by the rise angle of the helical slot. Preferably the slot will begin to pass between the printing lamp and the film gate when a complete picture frame has reached a position at the top of the aperture in the film gate, at which position the printing beam will coincide with the picture frame. Subsequent movement of the films downwardly upon the printing sprocket will be at a rate equal to that of the downward movement of the beam in the film gate aperture so that the complete picture frame continues to be exposed by the moving beam until the frame reaches a point at the bottom of the aperture at which time the passage of the slot before the lamp terminates and the printing beam is occluded. The dark interval persists until the subsequent complete frame has reached a position at the top of the film gate aperture when the slot again arrives at the position in which it begins to uncover the beam. It will be apparent that the ratio of exposure time to the dark interval is determined entirely by the extent to which the slot encircles the drum. It will also be apparent that the power of the optical projection system will determine the necessary width of the slot and that, in addition to this power, the speed of rotation of the drum and the rise angle of the helical slot will determine the rate of travel of the beam projected at the film gate. Since it is necessary that the films travel past the gate upon the sprocket at a speed equal to that of the downward movement of the printing beam, all three of the latter factors must be considered in the determination of the speed of rotation of the printing sprocket.

The printing sprocket 26 is driven by the same shaft 61 which drives the drum. This shaft supported in the bearing 68, which is mounted on wall 30, has secured thereon the worm 69 which meshes with worm gear 70. The latter is keyed to shaft 71 which extends through the wall 30 and on which the printing sprocket 26 is rigidly fixed (see Fig. 4). By a suitable selection of worm and gear ratios the printing sprocket may be driven at the speed necessary to move the films in synchronism with the travel of the printing beam, which as has been noted, is proportional to the speed of rotation of the drum. Another necessary adjustment, which is required for the successful operation of the described apparatus, is the orientation of the printing sprocket upon shaft 71 so that a single sprocket tooth may engage the leading edges of the aligned perforations of the superposed films during the entire exposure interval, as previously disclosed in this specification.

It will be apparent to those skilled in the art that the printing beam may be caused to travel in synchronism with the movement of the films by other mechanism than the above-described drum-type shutter and the invention is accordingly not necessarily restricted to an apparatus employing such a shutter. For example, a disc-type shutter, such as illustrated in Fig. 7, may be substituted for the drum-type shutter of the apparatus seen in Figs. 1 and 2. This disc 72 will include a spiral slot 73, the rotation of which will cause the printing beam, defined by the passage of light through the slot, to move in the direction of travel of the films upon the printing sprocket, the rate of travel of the beam being determined by the speed of rotation of the disc and the rise of the spiral slot (i. e., the rate of change of the generating radius). The disadvantage of this type of shutter, however, lies in the fact that on 16 mm. film the clearance between frames is insufficient to prevent light overlapping adjoining frames due to curvature of the slot edges. This type of shutter would be satisfactory, however, for use in printing 35 mm. films where frame-lines of comparatively greater thickness are normally used.

Still another type of shutter mechanism that might be employed is diagrammatically illustrated in Fig. 8. The drive shaft 78, to which is fixed a light-intercepting shutter blade 74, has also fixed thereto a cam 75 against which the element 76 is retained in continuous pressure contact. The latter is free to move in a vertical direction only and will, accordingly, be imparted a reciprocating vertical motion by the rotation of the cam. An aperture 77 is this element defines the limits of the printing beam which thus travels in a vertical direction. During the downward motion the shutter blade 74 uncovers the printing lamp and the exposure is effected by the downwardly moving beam which is synchronized with the travel of the films upon the printing sprocket. Near the end of this downward travel the blade interceps the printing beam and the light remains occluded while the cam drives the element 76 upwardly. Upon the reversal of this upward motion of element 76, blade 74 again uncovers the lamp and the previous operation is repeated.

Still another modification which is within the scope of the present invention is to provide such a drum- or disc-type shutter, as described above, with a plurality of spaced helical or spiral slots, the periods of nonexposure occurring in the intervals between the slots, during which periods the transfer of the driving force from one printing sprocket tooth to the next is also effected. The use of such a modification will materially reduce the relative speed at which the drum or disc need be driven.

From the foregoing description, it will be apparent that we have provided means for obtaining all the objects and advantages of this invention.

What we claim and desire to secure by Letters Patent of the United States is:

1. In a contact printing machine for use with continuously moving, superposed strips of film having perforations along an edge thereof, a rotatable sprocket for advancing said films, means for guiding said films into engagement with the sprocket and stripping means for removing the films from the sprocket, said guide means and stripping means being so positioned relative to each other and to the sprocket that the films have only limited engagement with the sprocket, a source of illumination for producing a printing beam, a rotatable drum having an inclined slot therein through which each picture frame is intermittently exposed to the printing beam, means for synchronously rotating the drum and sprocket, the width and inclination of the drum slot being such and the rotation of the drum being so synchronized with that of the sprocket that the printing beam is caused to move in synchronism with the films upon the sprocket whereby a substantially complete picture frame is continuously exposed during the exposure interval while the films are in motion upon the sprocket, said sprocket having a row of teeth along its peripheral edge, the teeth being of a width substantially equal to the width of the film perforations and of a thickness less than the height of the perforations, the leading edges of said teeth being so spaced on the sprocket and the rotation of the drum being so synchronized with the rotation of the sprocket that but one such edge is in contact with the aligned edges of the perforations of the superposed film strips during the exposure interval.

2. In a contact printing machine for use with continuously moving, superposed strips of film having perforations along an edge thereof, a rotatable sprocket for advancing said films, means for guiding said films into engagement with the sprocket and stripping means for removing the films from the sprocket, said guide means and stripping means being so positioned relative to each other and to the sprocket that the films have only limited engagement with the sprocket, a source of illumination for producing a printing beam, a rotatable drum having a helical slot therein through which each picture frame is intermittently exposed to the printing beam, means for so mounting the drum that the axis thereof is inclined at an angle corresponding to the rise angle of the helical slot whereby said slot extends in a direction normal to the direction of travel of the films upon the sprocket, means for synchronously rotating the drum and sprocket, the width and rise angle of the helical slot being such that the printing beam is caused to travel in the direction of travel of the films upon the sprocket and at the same rate of speed whereby a substantially complete picture frame is continuously exposed during the exposure interval while the films are in motion, an aperture plate positioned in the printing beam and adapted to mask the beam to a width equal to the width of a picture frame, said sprocket having a row of teeth thereon, the teeth being of a width equal to the width of the film perforations and being of such thickness and so spaced upon the sprocket that the leading edge of a single tooth in said row is in contact with the aligned edges of the perforations of the superposed film strips during the exposure interval.

3. In a printing machine for use with a pair of continuously moving strips of film having perforations along an edge thereof, a single sprocket for simultaneously advancing the films, means for guiding each of said films into engagement with the sprocket and stripping means for removing each of said films from the sprocket, said guide means and stripping means being so positioned relative to the sprocket that each film has only limited engagement with the sprocket, means including a source of illumination for producing a printing beam for imaging an area of one film upon the second film, a rotatable drum having a helical slot therein through which each picture frame is intermittently exposed to the printing beam, means for synchronously rotating the drum and sprocket, the width and rise angle of the helical slot being such that the printing beam is caused to travel in the direction of travel of the films upon the sprocket and at the same rate of speed whereby a substantially complete picture frame is continuously exposed during the exposure interval while the films are in motion, said sprocket having a row of teeth along its peripheral edge, the teeth being of a width equal to the width of the film perforations and being of such thickness and so spaced upon the sprocket that each film is driven by the leading edge of a single tooth in said row contacting the leading edge of a film perforation during the exposure interval.

4. In a contact printing machine for use with continuously moving, superposed strips of film having perforations along the edges thereof, a rotatable sprocket for advancing said films, means for guiding said films into engagement with the sprocket and stripping means for removing the films from the sprocket, said guide means and stripping means being so positioned relative to each other and to the sprocket that the films have only limited engagement with the sprocket, a source of illumination for producing a printing beam, a rotatable drum having a helical slot therein through which each picture frame is intermittently exposed to the printing beam, means for so mounting the drum that the axis thereof is inclined at an angle corresponding to the rise angle of the helical slot whereby said slot extends in a direction normal to the direction of travel of the films upon the sprocket, means for synchronously rotating the drum and sprocket, the width and rise angle of the helical slot being such that the printing beam is caused to travel in the direction of travel of the films upon the sprocket and at the same rate of speed whereby a complete picture frame is continuously exposed during the exposure interval while the films are in motion, said sprocket having two rows of teeth, the teeth in one row being of a width equal to the width of the film perforations and of a thickness less than the height of the perforations, the leading edges of said teeth being so spaced on the sprocket and the rotation of the drum being so synchronized with the rotation of the sprocket that the leading edge of but one tooth in said one row contacts the aligned edges of the perforations of the superposed film strips to advance the films during the exposure interval, the teeth in the second row being of less width and of a smaller thickness than the corresponding dimensions of the film perforations, such teeth having leading edges which are aligned with those of the teeth of the first row which advance the films during the exposure interval.

5. In a printing machine for use with a pair of continuously moving strips of film having perforations along the edges thereof, a single sprocket for simultaneously advancing the films, means for guiding each of said films into engagement with the sprocket and stripping means for removing each of said films from the sprocket, said guide means and stripping means being so positioned relative to the sprocket that each film has only limited engagement with the sprocket, means including a source of illumination for producing a printing beam for imaging an area of one film upon the second film, a rotatable drum having a helical slot therein through which each picture frame is intermittently exposed to the printing beam, means for so mounting the drum that the axis thereof is inclined at an angle corresponding to the rise angle of the helical slot whereby said slot extends in a direction normal to the direction of travel of the films upon the sprocket, means for synchronously rotating the drum and sprocket, the width and rise angle of the helical slot being such that rotation of the drum causes the printing beam to travel in synchronism with the films upon the sprocket whereby a complete picture frame is continuously exposed during the exposure interval while the films are in motion upon the sprocket, an aperture plate positioned in the printing beam and adapted to mask the beam to a width equal to the width of a picture frame, said sprocket having two rows of teeth, the teeth in one row being of a width equal to the width of the film perforations and of a thickness less than the height of the perforations, the leading edges of said teeth being so spaced on the sprocket and the rotation of the drum being so synchronized with the rotation of the sprocket that each film is driven by a single tooth in said one row contacting the leading edge of a film perforation during the exposure interval, the teeth in the second row being of less width and of a smaller thickness than the corresponding dimensions of the film perforations, such teeth having leading edges which are aligned with those of the teeth of the first row which advance the films during the exposure interval.

6. In a contact printing machine for use with continuously moving, superposed strips of film having perforations along an edge thereof, a rotatable sprocket for advancing said films, means for guiding said films into engagement with the sprocket and stripping means for removing the films from the sprocket, said guide means and stripping means being so positioned relative to each other and to the sprocket that the films have only limited engagement with the sprocket, a source of illumination for producing a printing beam, a rotatable shutter in the form of a disc having a spirally formed slot therein extending only part way about the axis of the shutter disc, said shutter disc being positioned in the printing beam to intermittently expose each picture frame through said spiral slot, means for synchronously rotating the shutter disc and sprocket, the width and rise of the spiral slot being so dimensioned and the rotation of the shutter disc being so synchronized with that of the sprocket that the printing beam is caused to move in synchronism with the films upon the sprocket whereby a substantially complete picture frame is continously exposed during the exposure interval while the films are in motion upon the sprocket, said sprocket having a row of teeth along its peripheral edge, the teeth being of a width substantially equal to the width of the film perforations and of a thickness less than the height of the perforations, the leading edges of said teeth being so spaced on the sprocket and the rotation of the shutter disc being so synchronized with the rotation of the sprocket that but one such edge is in contact with the aligned edges of the perforations of the superposed film strips during the exposure interval.

7. In a contact printing machine for use with continuously moving, superposed strips of film having perforations along the edges thereof, a rotatable sprocket for advancing said films, means for guiding said films into engagement with the sprocket and stripping means for removing the films from the sprocket, said guide means and stripping means being so positioned relative to each other and to the sprocket that the films have only limited engagement with the sprocket, a source of illumination for producing a printing beam, a rotatable shutter in the form of a disc having a spirally formed slot therein extending only part way about the axis of the shutter disc, said shutter disc being positioned in the printing beam to intermittently expose each picture frame through said spiral slot, means for synchronously rotating the shutter disc and sprocket, the width and rise of the spiral slot being so dimensioned and the rotation of the shutter disc being so synchronized with that of the sprocket that the printing beam is caused to move in synchronism with the films upon the sprocket whereby a substantially complete picture frame is continuously exposed during the exposure interval while the films are in motion upon the sprocket, said sprocket having two rows of teeth, the teeth in one row being of a width equal to the width of the film perforations and of a thickness less than the height of the perforations, the leading edges of said teeth being so spaced on the sprocket and the rotation of the shutter disc being so synchronized with the rotation of the sprocket that the leading edge of but one tooth in said one row contacts the aligned edges of the perforations of the superposed film strips to advance the films during the exposure interval, the teeth in the second row being of less width and of a smaller thickness than the corresponding dimensions of the film perforations, such teeth having leading edges which are aligned with those of the teeth of the first row which advance the films during the exposure interval.

References Cited in the file of this patent

UNITED STATES PATENTS

| | | |
|---|---|---|
| 1,699,169 | Thurstone | Jan. 15, 1929 |
| 2,288,079 | Fitz | June 30, 1942 |
| 2,552,255 | Capstaff | May 8, 1951 |

FOREIGN PATENTS

| | | |
|---|---|---|
| 51,375 | Netherlands | Nov. 15, 1941 |